(12) United States Patent
Sharma et al.

(10) Patent No.: US 10,474,446 B2
(45) Date of Patent: Nov. 12, 2019

(54) INSTALLATION TOOL FOR ADHERING TO ENTERPRISE REQUIREMENTS

(71) Applicant: BANK OF AMERICA CORPORATION, Charlotte, NC (US)

(72) Inventors: Sumit Sharma, Meerut (IN); Deepak Bhardwaj, Meerut (IN); Sunil Devagupthapu, Secunderabad (IN); Manoj K. Pollam, Secunderabad (IN)

(73) Assignee: Bank of America Corporation, Charlotte, NC (US)

( * ) Notice: Subject to any disclaimer, the term of this patent is extended or adjusted under 35 U.S.C. 154(b) by 267 days.

(21) Appl. No.: 15/267,592

(22) Filed: Sep. 16, 2016

(65) Prior Publication Data
US 2018/0081667 A1    Mar. 22, 2018

(51) Int. Cl.
*G06F 8/65* (2018.01)
*G06F 8/61* (2018.01)
*H04L 29/08* (2006.01)

(52) U.S. Cl.
CPC .......... *G06F 8/65* (2013.01); *G06F 8/61* (2013.01); *H04L 67/34* (2013.01); *G06F 8/62* (2013.01)

(58) Field of Classification Search
None
See application file for complete search history.

(56) References Cited

U.S. PATENT DOCUMENTS

| | | | |
|---|---|---|---|
| 6,735,766 B1 | 5/2004 | Chamberlain | |
| 6,832,371 B1* | 12/2004 | Hussey | G06F 9/5011 713/100 |
| 7,080,371 B1 | 7/2006 | Arnaiz | |
| 7,472,385 B2 | 12/2008 | Chamberlain | |
| 7,487,543 B2* | 2/2009 | Arnold | G06F 21/51 713/151 |
| 8,875,091 B1 | 10/2014 | Rouleau | |
| 9,165,142 B1* | 10/2015 | Sanders | G06F 21/566 |
| 2004/0194079 A1* | 9/2004 | Nguyen | G06F 8/65 717/168 |
| 2005/0234997 A1* | 10/2005 | Gu | G06F 17/30067 |
| 2005/0278535 A1* | 12/2005 | Fortune | G06F 8/61 713/176 |
| 2006/0005248 A1* | 1/2006 | Wu | G06F 21/121 726/26 |

(Continued)

*Primary Examiner* — Wei Y Zhen
*Assistant Examiner* — Binh Luu
(74) *Attorney, Agent, or Firm* — Michael A. Springs

(57) ABSTRACT

An installation tool includes a memory, a retrieval engine, an extraction engine, a configuration engine, a compiler, and an installer. The memory stores installation parameters of a previous software update for an application. The retrieval engine receives a request to install a first software update for the application and in response to the request, retrieves the installation parameters of the previous software update. The extraction engine extracts from the application a plurality of source binary files for the application. The configuration engine receives a plurality of requirements for installing the first software update based upon the retrieved installation parameters. The compiler creates an installation executable for the first software update based upon the plurality of source binary files and the plurality of requirements. The installer executes the installation executable to apply the first software update according to the plurality of requirements.

18 Claims, 3 Drawing Sheets

(56) References Cited

U.S. PATENT DOCUMENTS

| | | | |
|---|---|---|---|
| 2007/0198527 A1* | 8/2007 | Rasmussen | G06F 16/10 |
| 2007/0234311 A1* | 10/2007 | Plummer | G06F 9/449 717/136 |
| 2008/0082967 A1* | 4/2008 | Kasman | G06F 8/36 717/124 |
| 2008/0301660 A1* | 12/2008 | Rao | G06F 8/65 717/170 |
| 2008/0301672 A1* | 12/2008 | Rao | G06F 8/61 717/177 |
| 2010/0281083 A1* | 11/2010 | Purtell, II | G06F 16/122 707/822 |
| 2013/0067599 A1* | 3/2013 | Raje | G06F 8/65 726/29 |
| 2013/0117433 A1* | 5/2013 | Choi | H04L 41/00 709/223 |
| 2014/0007075 A1* | 1/2014 | Sporkert | G06F 8/68 717/173 |
| 2014/0053148 A1* | 2/2014 | Chan | G06F 8/41 717/174 |
| 2014/0109072 A1* | 4/2014 | Lang | G06F 8/52 717/168 |
| 2014/0237462 A1* | 8/2014 | Zh Eng; Wei | G06F 8/62 717/170 |
| 2015/0319252 A1* | 11/2015 | Momchilov | H04L 67/141 709/223 |
| 2016/0188299 A1* | 6/2016 | Howard | G06F 8/20 717/105 |
| 2016/0371105 A1* | 12/2016 | Sieffert | G06F 9/45545 |
| 2016/0378447 A1* | 12/2016 | Nandakumar | G06F 8/53 717/108 |
| 2017/0269954 A1* | 9/2017 | Hardy | G06F 9/45558 |
| 2017/0269955 A1* | 9/2017 | Hardy | G06F 9/45558 |
| 2018/0024826 A1* | 1/2018 | Caushi | G06F 8/65 717/172 |
| 2018/0217827 A1* | 8/2018 | Arcese | G06F 8/65 |

\* cited by examiner

INSTALLATION TOOL FOR ADHERING TO ENTERPRISE REQUIREMENTS

TECHNICAL FIELD

This disclosure relates generally to the installation of application updates and patches.

BACKGROUND

Software applications may be deployed across multiple devices of an enterprise. These software applications may be updated and/or improved by applying software patches and/or updates to the applications.

SUMMARY OF THE DISCLOSURE

According to an embodiment, an installation tool includes a memory, a retrieval engine, an extraction engine, a configuration engine, a compiler, and an installer. The memory stores installation parameters of a previous software update for an application. The retrieval engine receives a request to install a first software update for the application and in response to the request, retrieves the installation parameters of the previous software update. The extraction engine extracts from the application a plurality of source binary files for the application. The configuration engine receives a plurality of requirements for installing the first software update based upon the retrieved installation parameters. The compiler creates an installation executable for the first software update based upon the plurality of source binary files and the plurality of requirements. The installer executes the installation executable to apply the first software update according to the plurality of requirements.

According to another embodiment, a method includes storing installation parameters of a previous software update for an application and receiving a request to install a first software update for the application. The method also includes in response to the request, retrieving the installation parameters of the previous software update and extracting from the application a plurality of source binary files for the application. The method further includes receiving a plurality of requirements for installing the first software update based upon the retrieved installation parameters and creating an installation executable for the first software update based upon the plurality of source binary files and the plurality of requirements. The method also includes executing the installation executable to apply the first software update according to the plurality of requirements.

According to yet another embodiment, a system includes an installation database, a retrieval engine, an extraction engine, a configuration engine, a compiler, and an installer. The installation database stores installation parameters of a previous software update for an application. The retrieval engine receives a request to install a first software update for the application and in response to the request, retrieves the installation parameters of the previous software update from the installation database. The extraction engine extracts from the application a plurality of source binary files for the application. The configuration engine receives a plurality of requirements for installing the first software update based upon the retrieved installation parameters. The compiler creates an installation executable for the first software update based upon the plurality of source binary files and the plurality of requirements. The installer executes the installation executable to apply the first software update according to the plurality of requirements.

Certain embodiments provide one or more technical advantages. For example, an embodiment improves the installation of applications by creating an installation executable that is appropriate for a host device. As another example, an embodiment improves system and/or network security by creating an installation executable that adheres to security protocols. As yet another example, an embodiment transforms installation executables by decompiling applications and/or updates, changing installation requirements, and then compiling new installation executables. Certain embodiments may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present disclosure, reference is now made to the following description, taken in conjunction with the accompanying drawings, in which.

DETAILED DESCRIPTION

Figure 1:
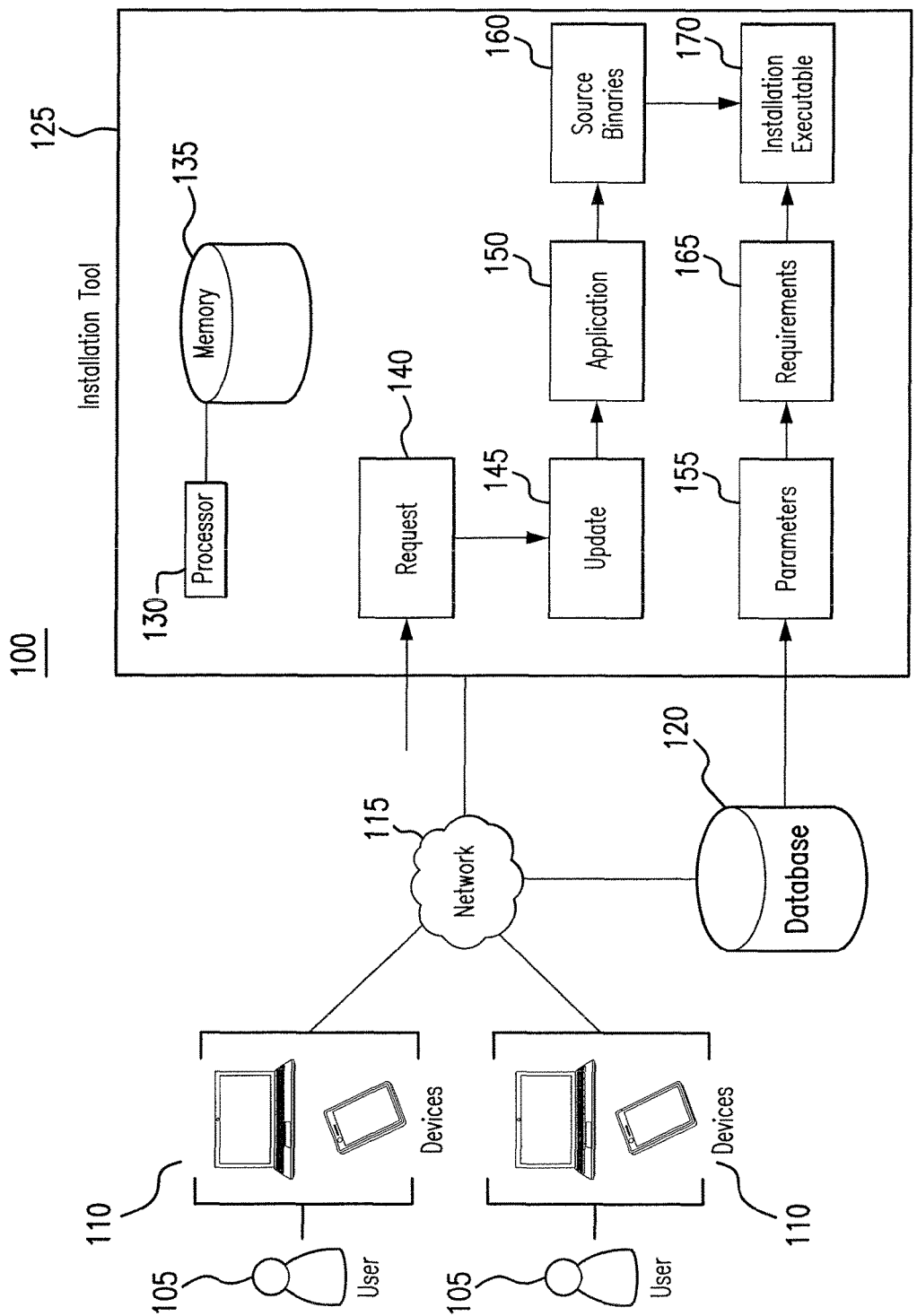
FIG. 1 illustrates a system for creating an installation executable.
Figure 2:
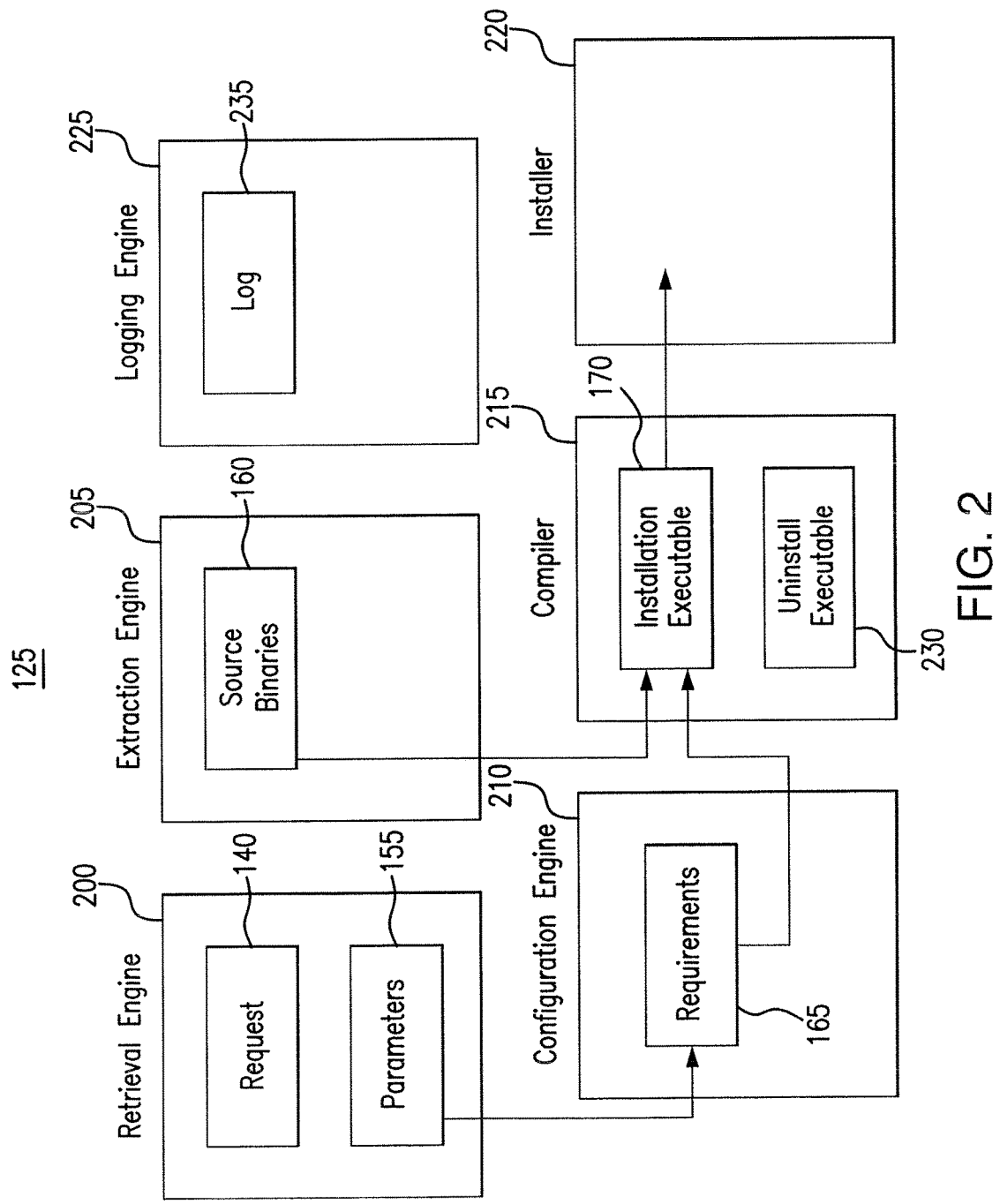
FIG. 2 illustrates the installation tool of the system of FIG. 1.
Figure 3:
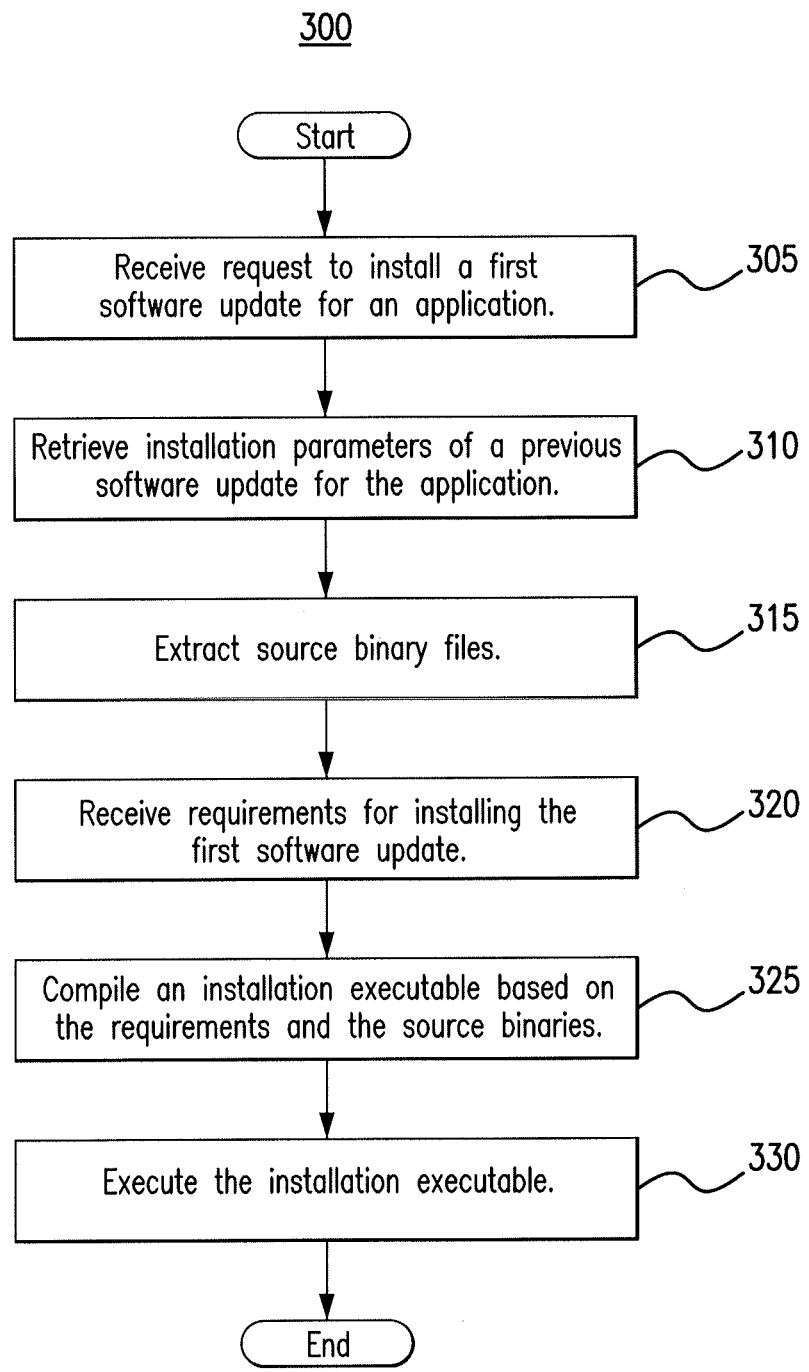
FIG. 3 is a flowchart illustrating a method for creating an installation executable using the system of FIG. 1.

Embodiments of the present disclosure and its advantages are best understood by referring to FIGS. 1 through 3 of the drawings, like numerals being used for like and corresponding parts of the various drawings.

Software applications may be deployed across multiple devices of an enterprise. These software applications may be updated and/or improved by applying software patches and/or updates to the applications. In certain instances, multiple patches and/or updates may be released for an application across a period of time to improve the operation of the application and/or to repair bugs and/or security flaws in the applications. These updates and applications may be developed by a developer that is not part of the enterprise. Furthermore, these applications and/or updates may be developed for multiple enterprises.

When an enterprise receives a software update, the enterprise installs the update to apply the update to the software application. However, each enterprise that applies the update may have its own internal policies and/or requirements for software. For example, an enterprise may require that applications be installed to certain file paths that are distinct to that enterprise. As another example, an enterprise may require that certain security policies be implemented when the application and/or update is installed. As yet another example, an enterprise may require that certain naming conventions are followed when the update and/or application is installed. Because applications and/or updates may not be developed to adhere to policies that are distinct to a particular enterprises, the application and/or update may not be suitable for installation upon release. Additionally, as more patches and/or updates are released across a period of time it may become more difficult to ensure that the patch and/or update adheres to the enterprise's policies.

This disclosure contemplates an installation tool that creates, for updates and applications, installation executables that adhere to an enterprise's policies. For example, the installation tool may ensure that the newly created installation executable adheres to the security policies of the enterprise thereby improving the security of a network and/or system. As another example, the newly created installation executable may adhere to the enterprise's naming policies. As yet another example, the installation tool may log and track the enterprise's policies with regards to a particular application. In particular embodiments, the installation tool improves the installation process by creating installation executables that adhere to an enterprise's policies. The installation tool transforms installation executables by decompiling applications and/or updates, changing installation requirements, and compiling new installation executables. The installation tool will be described in more detail using FIGS. 1 through 3. FIG. 1 will describe the installation tool generally. FIGS. 2 and 3 will describe the installation tool in more detail.

FIG. 1 illustrates a system 100 for creating an installation executable. As illustrated in FIG. 1, system 100 includes one more devices 110, a network 115, a database 120, and an installation tool 125. In particular embodiments, system 100 improves the installation process for applications, updates, and/or patches by creating installation executables that adhere to an enterprise's policies.

Devices 110 may be any devices that operate and/or communicate with other components of system 100. Devices 110 may execute software applications that are updated through software patches and/or updates. When an application, patch, or update is release, the application, patch, or update may be installed to devices 110. Devices 110 may be part of an enterprise that has policies distinct to that enterprise that must be followed in order for the applications, patches, and/or updates to be installed to devices 110. For example, the enterprise may desire that certain security policies are followed during installation. As another example, the enterprise may have certain naming conventions and/or installation paths that should be followed during installation. However, application, patches, and/or updates may not be developed with the enterprise's policies in mind. In other words, applications, patches, and/or updates may be received by the enterprise but may need further configuring before the applications, patches, and/or updates may be installed.

This disclosure contemplates device 110 being any appropriate device for sending and receiving communications over network 115. As an example and not by way of limitation, device 110 may be a computer, a laptop, a wireless or cellular telephone, an electronic notebook, a personal digital assistant, a tablet, or any other device capable of receiving, processing, storing, and/or communicating information with other components of system 100. Device 110 may also include a user interface, such as a display, a microphone, keypad, or other appropriate terminal equipment usable by user 105. In some embodiments, an application executed by device 110 may perform the functions described herein.

Network 115 facilitates communication between and amongst the various components of system 100. This disclosure contemplates network 115 being any suitable network operable to facilitate communication between the components of system 100. Network 115 may include any interconnecting system capable of transmitting audio, video, signals, data, messages, or any combination of the preceding. Network 115 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

Database 120 stores installation parameters and/or requirements of an enterprise. For example, database 120 may store installation instructions and/or registry keys for an application update and/or patch. Whenever an application update or patch is installed, the installation instructions and/or registry keys may be reviewed and/or updated for the particular application, update, or patch. In particular embodiments, database 120 may also store comments generated by a user 105 who installs the application, update, or patch. These comments and/or instructions may be retrieved at a later time to install future applications, updates, and/or patches.

Installation tool 125 generates installation executables that adhere to an enterprise's policies. As illustrated in FIG. 1, installation tool 125 includes a processor 130 and a memory 135. This disclosure contemplates processor 130 and memory 135 being configured to perform any of the operations of installation tool 125 described herein. In particular embodiments, installation tool 125 improves the operation of an application, update and/or patch by generating installation executables that adhere to an enterprise's policies.

Processor 130 is any electronic circuitry, including, but not limited to microprocessors, application specific integrated circuits (ASIC), application specific instruction set processor (ASIP), and/or state machines, that communicatively couples to memory 140 and controls the operation of installation tool 125. Processor 130 may be 8-bit, 16-bit, 32-bit, 64-bit or of any other suitable architecture. Processor 130 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 130 may include other hardware and software that operates to control and process information. Processor 130 executes software stored on memory to perform any of the functions described herein. Processor 130 controls the operation and administration of installation tool 125 by processing information received from network 115, device(s) 110, and memory 135. Processor 130 may be a programmable logic device, a microcontroller, a microprocessor, any suitable processing device, or any suitable combination of the preceding. Processor 130 is not limited to a single processing device and may encompass multiple processing devices.

Memory 135 may store, either permanently or temporarily, data, operational software, or other information for processor 130. Memory 135 may include any one or a combination of volatile or non-volatile local or remote devices suitable for storing information. For example, memory 135 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 135, a disk, a CD, or a flash drive. In particular embodiments, the software may include an application executable by processor 130 to perform one or more of the functions described herein. In particular embodiments, memory 135 may store parameters 155 and requirements 165. This disclosure contemplates memory 135 storing any of the elements stored in database 120 and/or by installation tool 125.

Installation tool 125 receives a request 140. Request 140 may indicate that an application, update, and/or patch should installed. Request 140 may be sent by one or more devices 110. Request 140 may indicate the name of an application, update, and/or patch. Request 140 may indicate that an update and/or patch is for a particular application.

Installation tool 125 may analyze request 140 to determine an update 145 and an application 150. In particular embodiments, update 145 may be applied to application 150 to improve the operation of application 150. For example, update 145 may fix certain bugs or errors within application 150. As another example, update 145 may fix security flaws of application 150. Update 145 and/or application 150 may not be developed to adhere to the policies of a particular enterprise. As a result, before that enterprise can install application 150 and/or update 145, the enterprise must configure update 145 and/or application 150 to adhere to the enterprise's policies. Installation tool 125 may assist in that process.

In response to receiving request 140, installation tool 125 may retrieve installation parameters 155 from database 120. Installation parameters 155 may indicate various parameters of installing update 145 and/or application 150. For example, parameters 155 may indicate installation instructions and/or comments for update 145 and/or application 150. As another example, parameters 155 may include registry keys that should be changed to adhere to an enterprise's policies. As another example, parameters 155 may include folder names and/or paths for update 145 and application 150 that adheres to an enterprise's policies. Parameters 155 may be updated by users 105 after installing an application, update, and/or patch. In this manner, parameters 155 may be useful for subsequent installations of applications, updates, and/or patches.

Installation tool 125 may extract source binary files 160 from update 145 and/or application 150. Source binary files 160 may include certain source code for update 145 and/or application 150. Source binary files 160 may be used to generate new installation executables 170. In particular embodiments, installation tool 125 extracts source binary files 160 by decompiling application 150 and/or update 145. In some embodiments, source binary files 160 may be extracted from a previous software update, such as for example, the update installed before update 145. Installation tool 125 may edit and recompile source binary files 160 to generate new installation executables that adhere to an enterprise's policies. Changes to source binary files 160 may be made according to requirements 165.

Installation tool 125 may receive installation requirements 165. For example, installation tool 125 may extract installation requirements 165 from installation parameters 155. As yet another example, a user 105 may analyze installation parameters 155 and communicate installation requirements 165 based off installation parameters 155. Installation requirements 165 may include paths in which update 145 and/or application 150 should be installed. In particular embodiments, the indicated path may be a path where source binary files 160 should be copied during installation or otherwise. Installation requirements 165 may also include registry keys and their values for the installation of update 145 and application 150. In some embodiments, registry keys of a device 110 are updated according to the registry key and registry key values indicated by requirements 165 during the installation process. Installation requirements 165 may indicate a file that should be deleted when update 145 is applied and/or when application 150 is installed. When update 145 and/or application 150 are installed, installation tool 125 may delete the file indicated by requirements 165. In particular embodiments, the paths, file names, registry keys, etc. may be determined according to an enterprise's policies.

Installation tool 125 may compile source binary files 160 with the requirements 165 to generate installation executable 170. In particular embodiments, installation executable 170 may adhere to an enterprise's policies because requirements 165 adhere to the enterprise's policies. Installation executable 170 may then be executed on one or more devices 110 and/or installation tool 125 to install update 145 and/or application 150 according to the enterprise's policies.

In particular embodiments, installation tool 125 may also generate an uninstall executable based on source binaries 160 and requirements 165. For example, update 145 may include a plurality of features that require installation. Installation tool 125 may generate an uninstall executable based on source binaries 160 and requirements 165 that when executed uninstalls each of these plurality of features.

FIG. 2 illustrates the installation tool 125 of the system 100 of FIG. 1. As illustrated in FIG. 2, installation tool 125 includes retrieval engine 200, extraction engine 205, configuration engine 210, compiler 215, installer 220, and logging engine 225. In particular embodiments, installation tool 125 improves the installation of applications and/or updates by creating installation executables 170 that adhere to an enterprise's policies.

Retrieval engine 200 receives request 140 and parameters 155. In particular embodiments, retrieval engine 200 receives request 140 from one or more devices 110. Retrieval engine 200 receives parameters 155 from database 120. As discussed previously, parameters 155 may be generated and/or updated each time an application and/or update are installed. Parameters 155 may include installation parameters such as paths, file names, and/or registry keys that should be applied and/or updated during installation. An example algorithm for retrieval engine 200 is as follows: wait for request 140; receive request 140 from one or more devices 110; in response to receiving request 140, retrieve parameters 155 from database 120; receive parameters 155; send parameters 155 to configuration engine 210.

Extraction engine 205 extracts source binary files 160 from updates and/or applications. Source binary files 160 may include source code for an update and/or an application. In particular embodiments, extraction engine 205 extracts source binary files 160 based on request 140. For example, request 140 may identify an application and/or an update. Extraction engine 205 may extract source binary files 160 from the identified update and/or application. In some embodiments, extraction engine 205 extracts source binaries 160 from previous installations of an update. An example algorithm for extraction engine 205 is as follows: receive notification from retrieval engine 200 that request 140 has been received; analyze request 140 to determine an update and/or an application; find the identified update and/or application; decompile the update and/or application to create source binary files 160.

Configuration engine 210 generates requirements 165 from parameters 155. Requirements 165 may include the file names, file paths, registry keys, etc. for the installation such that the installation complies with an enterprise's policies. For example, requirements 165 may indicate the naming conventions to be followed for the installation files. As another example, requirements 165 may indicate the path where the installation is to be made. As yet another example, requirements 165 may indicate the registry keys and their values that need to be updated during installation. In some embodiments, configuration engine 210 receives requirements 165 from a user 105 after the user 105 has reviewed parameters 155. For example, the users may input requirements 165 after reviewing parameters 155. An example algorithm for configuration engine 210 is as follows: receive indication from retrieval engine 200 that parameters 155 have been retrieved; communicate parameters 155 to a user 105; wait for requirements 165 from user 105; receive requirements 165 from user 105.

Compiler 215 uses source binary files 160 and requirements 165 to generate installation executable 170. In particular embodiments, compiler 215 compiles source binaries 160 using installation requirements 165 to generate installation executable 170. Installation executable 170 will adhere to the requirements indicated by requirements 165. When installation executable 170 is executed, an update or application is installed pursuant to requirements 165. Compiler 215 communicates installation executable 170 to an installer 220 for installation. An example algorithm for compiler 215 is as follows: receive indication from extraction engine 205 that source binary files 160 are ready; receive indication from configuration engine 210 that requirements 165 are ready; compile source binary files 160 based on requirements 165 to generate installation executable 170; communicate installation executable 170 to installer 220.

In particular embodiments, compiler 215 generates an uninstall executable 230 for an update and/or application. When the uninstall executable 230 is executed, certain files for the update and/or application are removed from a device. In some embodiments, the update and/or application may install several features. Uninstall executable 230 may be executed to remove each of these features.

Installer 220 receives installation executable 170 from compiler 215. Installer 220 executes installation executable 170 to install an update and/or an application pursuant to requirements 165. An example algorithm for installer 220 is as follows: wait for installation executable 170 from compiler 215; receive installation executable 170 from compiler 215; execute installation executable 170 after receiving installation executable 170.

Logging engine 225 maintains a log 235 that tracks when a software update and/or application is installed. For example, when an application and/or update is installed, logging engine 225 may indicate in log 235 that the application and/or update has been installed. Likewise, logging engine 225 may track and log 235 when an application and/or update have been uninstalled. In some embodiments, logging engine 225 may write log 235 to database 120 to update parameters 155. An example algorithm for logging engine 225 is as follows: wait for indication that an update is installed; receive indication that update is installed from installer 220; indicate in log 235 that update is installed; write log 235 to a database.

FIG. 3 is a flowchart illustrating a method 300 for creating an installation executable using the system 100 of FIG. 1. In particular embodiments, installation tool 125 performs method 300. By performing method 300, installation tool 125 improves the operation of an application by creating installation executables that comply with an enterprise's policies.

Installation tool 125 begins by receiving a request to install a first software update for an application in step 305. In step 310, installation tool 125 retrieves installation parameters of a previous software update for the application. Installation tool 125 then extracts source binary files in step 315. The source binary files may be extracted from a previous update and/or the application itself.

In step 320, installation tool 125 receives requirements for installing the first software update. Installation tool 125 then compiles an installation executable based on the requirements and the source binary files in step 325. In step 330, installation tool 125 installs the update by executing the installation executable.

Modifications, additions, or omissions may be made to method 300 depicted in FIG. 3. Method 300 may include more, fewer, or other steps. For example, steps may be performed in parallel or in any suitable order. While discussed as installation tool 125 performing the steps, any suitable component of system 100, such as device(s) 110 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as fall within the scope of the appended claims.

What is claimed is:

1. An installation tool comprising:
a memory configured to store installation parameters of a previous software update for an application; and
a hardware processor communicatively coupled to the memory, the hardware processor configured to implement:
a retrieval engine configured to:
receive a request to install a first software update for the application, the first software update configured to fix a security flaw of the application when applied; and
in response to the request, retrieve the installation parameters of the previous software update;
an extraction engine configured to decompile the application and the previous software update to extract from the application and the previous software update a plurality of source binary files for the application;
a configuration engine configured to receive a plurality of requirements for installing the first software update based upon the retrieved installation parameters and to edit the plurality of source binary files according to the plurality of requirements, the plurality of requirements comprises a path where the plurality of source binary files should be copied, a registry key that is updated when the first software update is applied, and a value for the registry key;
a compiler configured to compile the plurality of source binary files with the plurality of requirements to create an installation executable for the first software update that adheres to the plurality of requirements when executed; and
an installer configured to execute the installation executable to apply the first software update according to the plurality of requirements, to copy the source binary files to the path during installation, and to update the registry key according to the value when the first software update is applied.

2. The installation tool of claim 1, wherein the plurality of requirements comprises a second registry key.

3. The installation tool of claim 1, wherein:
the plurality of requirements comprises a path of a file that is to be deleted when the first software update is applied; and
the installer deletes the file when the first software update is applied.

4. The installation tool of claim 1, further comprising a logging engine configured to indicate in a log that the first software update is applied.

5. The installation tool of claim 1, wherein:
the first software update includes a plurality of features; and
the compiler creates an uninstall executable that, when executed, uninstalls the plurality of features.

6. The installation tool of claim 1, wherein the extraction engine is further configured to extract the plurality of source binary files from the previous software update.

7. A method comprising:
storing installation parameters of a previous software update for an application;
receiving a request to install a first software update for the application, the first software update configured to fix a security flaw of the application when applied;
in response to the request, retrieving the installation parameters of the previous software update;
decompiling the application and the previous software update to extract from the application and the previous software update a plurality of source binary files for the application;
receiving a plurality of requirements for installing the first software update based upon the retrieved installation parameters, the plurality of requirements comprises a path where the plurality of source binary files should be copied, a registry key that is updated when the first software update is applied, and a value for the registry key;
editing the plurality of source binary files according to the plurality of requirements;
compiling the plurality of source binary files with the plurality of requirements to create an installation executable for the first software update that adheres to the plurality of requirements when executed; and
executing the installation executable to apply the first software update according to the plurality of requirements, to copy the source binary files to the path during installation, and to update the registry key according to the value when the first software update is applied.

8. The method of claim 7, wherein the plurality of requirements comprises a second registry key.

9. The method of claim 7, further comprising deleting a file when the first software update is applied, wherein the plurality of requirements comprises a path of the file that is to be deleted when the first software update is applied.

10. The method of claim 7, further comprising indicating in a log that the first software update is applied.

11. The method of claim 7, further comprising creating an uninstall executable that, when executed, uninstalls a plurality of features, wherein the first software update includes the plurality of features.

12. The method of claim 7, further comprising extracting the plurality of source binary files from the previous software update.

13. A system comprising:
an installation database configured to store installation parameters of a previous software update for an application;
an installation tool comprising a hardware processor configured to:
receive a request to install a first software update for the application, the first software update configured to fix a security flaw of the application when applied; and
in response to the request, retrieve the installation parameters of the previous software update from the installation database;
decompile the application and the previous software update to extract from the application and the previous software update a plurality of source binary files for the application;
receive a plurality of requirements for installing the first software update based upon the retrieved installation parameters, the plurality of requirements comprises a path where the plurality of source binary files should be copied, a registry key that is updated when the first software update is applied, and a value for the registry key;
edit the plurality of source binary files according to the plurality of requirements;
compile the plurality of source binary files with the plurality of requirements to create an installation executable for the first software update that adheres to the plurality of requirements when executed; and
execute the installation executable to apply the first software update according to the plurality of requirements, to copy the source binary files to the path during installation, and to update the registry key according to the value when the first software update is applied.

14. The system of claim 13, wherein the plurality of requirements comprises a second registry key.

15. The system of claim 13, wherein:
the plurality of requirements comprises a path of a file that is to be deleted when the first software update is applied; and
the installer deletes the file when the first software update is applied.

16. The system of claim 13, further comprising a logging engine configured to indicate in a log that the first software update is applied.

17. The system of claim 13, wherein:
the first software update includes a plurality of features; and
the installer creates an uninstall executable that, when executed, uninstalls the plurality of features.

18. The system of claim 13, wherein the extraction engine is further configured to extract the plurality of source binary files from the previous software update.

\* \* \* \* \*